June 13, 1967     J. F. REQUENA     3,324,620
FIXED SHUTTERS
Filed April 8, 1964
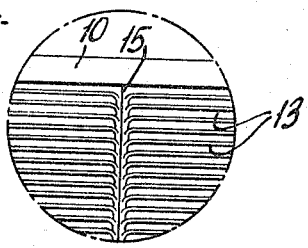
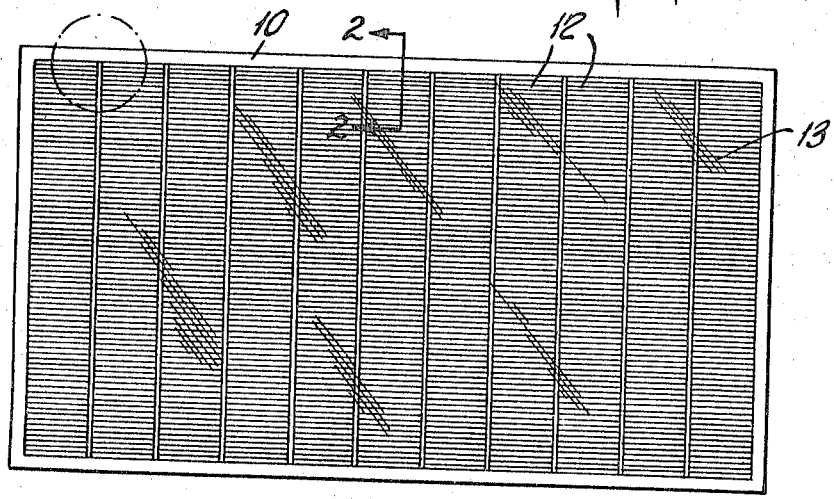
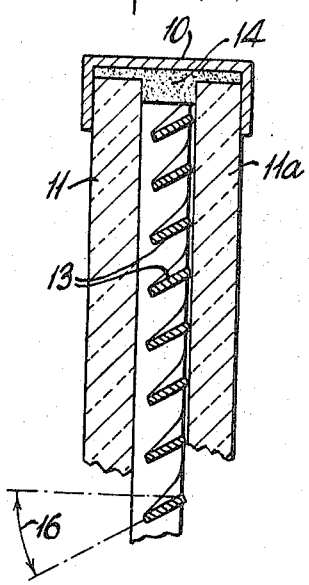
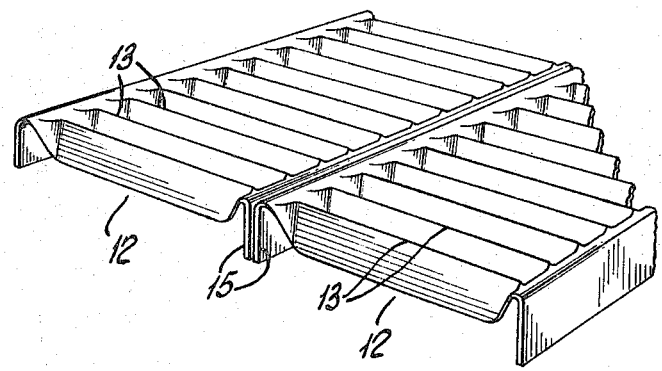
INVENTOR
JORGE FREDERICO REQUENA
BY *Steinberg & Blake*
ATTORNEYS 3,324,620
FIXED SHUTTERS
Jorge Federico Requena, Rua Sargento Joao Lopez 271,
Ilha do Governador, Rio de Janeiro, Brazil
Filed Apr. 8, 1964, Ser. No. 358,326
Claims priority, application Brazil, Aug. 16, 1963,
151,919/63
6 Claims. (Cl. 52—616)

The present invention refers to improvements introduced in shutters and, more specifically to an improved shutter composed of a panel or frame in which there are arranged, side by side, several stamped metallic or non-metallic blades in a manner such as to form a plurality of small inclined, horizontal crosspieces.

Modern architecture, considering questions of hygiene, esthetics or merely functional ones, calls for larger windows than usual, wider doors, going sometimes to the point of suppressing masonry walls, substituting them by glass sheets or similar arrangements.

Unfortunately, however, the increase in these spans, particularly those of the windows, diminishes in another form comfort because of the heat and the glare of the sun infiltrated through the windows.

The purpose of the present invention is to eliminate once and for all the problems indicated, providing an efficient and simple means to prevent the entry of the sun's rays, not allowing heat to penetrate, avoid glare and obstruct to a considerable extent external noises, all without prejudice to the panoramic view. This objective of the invention has the form of a delicate shutter, or "micro-shutter," which is placed on the outer side of the windows, thus intercepting the rays of the sun before these can reach the pane of the window itself.

The invention is substantiated in a chosen form as illustrated in the attached designs, in which:

FIGURE 1 represents an elevated view, showing the scheme of a panel or frame of a shutter built in accordance with the invention and showing in a fragmentary amplification, a constructive detail of the same.

FIGURE 2 shows a fragmentary, amplified sectional view of the shutter, looked at in the direction of the arrows of the line 2—2 in FIGURE 1, and FIGURE 3 is a fragmentary perspective of two of the blade elements which constitute the shutter illustrated in FIGURES 1 and 2.

FIG. 4 shows on an enlarged scale that part of the structure which is within the dot-dash circle of FIG. 1.

As may be inferred from the designs which illustrate and form part of this report, the shutter which is the object of the present invention, comprises a case or frame 10, which holds between two sheets, 11 and 11a of glass or some other adequate, transparent material, several narrow and long blades 12, stamped in the form of U, in a manner such as to form in each one of them a plurality of crosspieces or horizontal blades 13, juxtaposed with each other and arranged obliquely in relation to the plan of the panes. The glass panes 11 and 11a, on both sides of the blades 12, are fixed to the case or frame by means of an adequate adhesive material 14, which maintains the component parts firmly united and keeps the "micro-shutter" free of atmospheric impurities.

The blades 12 are on the external face or side covered with a thin film of titanium oxide acting as heat repellent and the internal face or side anodized or treated in metallic and dim colors of heat absorbing qualities, and the purpose of the glass panes is to protect them from atmospheric detritus and ensure, simultaneously, an appreciable if not total reduction in incommodious noise. As they are externally exposed, contrary to what happens with ordinary shutters, those of the present invention cause a reduction in temperature up to 8° C. lower than in other known systems. Another advantage of the shutter of this invention is that it prevents reflections in windows exposed to the sun, thus providing a highly comfortable visual rest, without prejudicing the entry of light.

In conjunction with air conditioned systems its application is advantageous because it reduces appreciably the calorific load of solar origin and, therefore, diminishes the operational cost of the system. For instance with 10 square metres of the shutter of this invention, it is possible to reduce the heat load in a ton of refrigeration. From the architectural point of view, it has the specialty of adapting itself to any kind of construction, introducing uniformity and eliminating incommodious reflexes.

It may be noted that the shutter of this present invention is practically imperceptible, even when placed in position, permitting up to 80% of clear visibility as well as visual comfort much superior to that of any known shutter or element of shade.

The anodization or painting protects it against corrosion, eliminating the need for preservation or painting subsequent to manufacture.

The shutter solar angles were pre-determined and subordinated to the structure itself of the narrow blades 12, which, in this way, unites the useful with the agreeable in an economical, elegant and modern manner.

Although the present invention has been illustrated and described in one of its preferred forms, it will be obvious that the shutter may vary in shape, dimensions, arrangements of the constituent parts and material without, however, going outside its ambit.

What I claim is:

1. A shutter unit comprising an outer frame, a pair of transparent substantially rigid sheets carried by said outer frame in substantially parallel relationship with respect to each other and with said sheets spaced from each other to define a given enclosure between themselves, and a plurality of one-piece elongated channel members situated in side by side relation within said enclosure between said transparent sheets, said channel members each having a pair of opposed side flanges extending between said sheets and each having between its side flanges a transverse wall extending substantially parallel to said sheets and including a series of integral slanted fins each extending transversely between said side flanges and situated in a plane inclined to said sheets.

2. A unit as recited in claim 1 and wherein said channel members which are arranged in side by side relation directly engage each other and completely fill said enclosure.

3. A unit as recited in claim 1 and wherein said sheets are made of glass.

4. A unit as recited in claim 1 and wherein each of said channel members is in the form of a one-piece metallic stamping.

5. A unit as recited in claim 1 and wherein all of said channel members are identically oriented in said enclosure.

6. The combination of claim 5 and wherein said identically oriented channel members extend vertically with said slanted fins extending horizontally.

References Cited
UNITED STATES PATENTS

| | | | |
|---|---|---|---|
| 2,849,762 | 9/1958 | McCarthy | 52—616 X |
| 2,874,423 | 2/1959 | Berg | 52—616 X |
| 3,008,196 | 11/1961 | Springer et al. | 52—616 |
| 3,077,643 | 2/1963 | Horner | 52—616 |
| 3,120,883 | 2/1964 | Greiling | 52—473 |

DAVID J. WILLIAMOWSKY, Primary Examiner.
HARRISON R. MOSELEY, Examiner.
P. C. KANNAN, Assistant Examiner.